A. McCOMBIE.
ORE FEEDER.
APPLICATION FILED APR. 18, 1907.
903,491.
Patented Nov. 10, 1908.
2 SHEETS—SHEET 2.
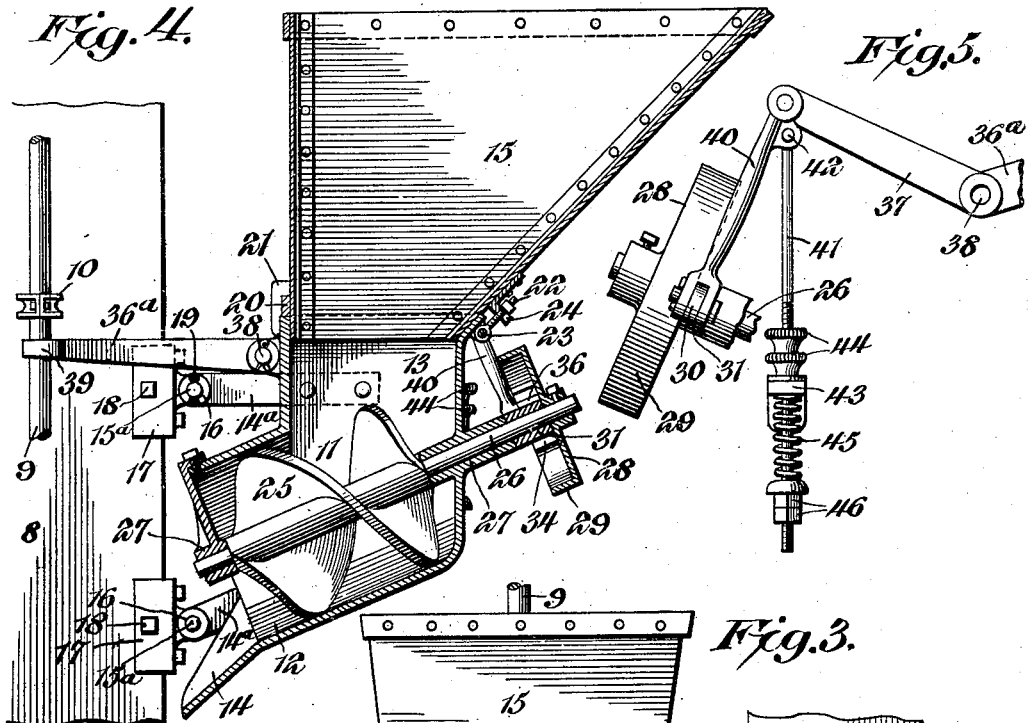
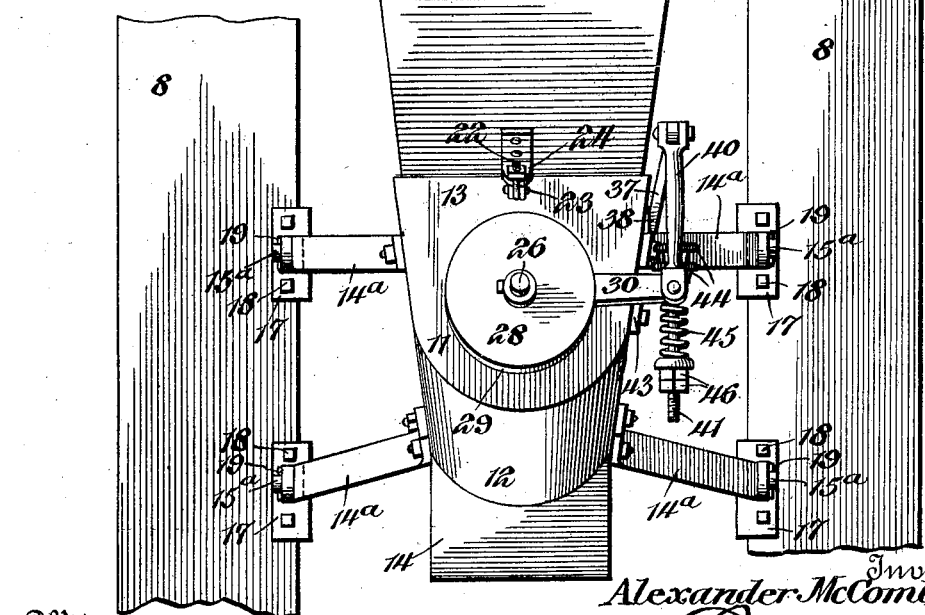
Witnesses
Howard D. Orn
B. G. Foster
Inventor,
Alexander McCombie,
By C. G. Siggers
Attorney

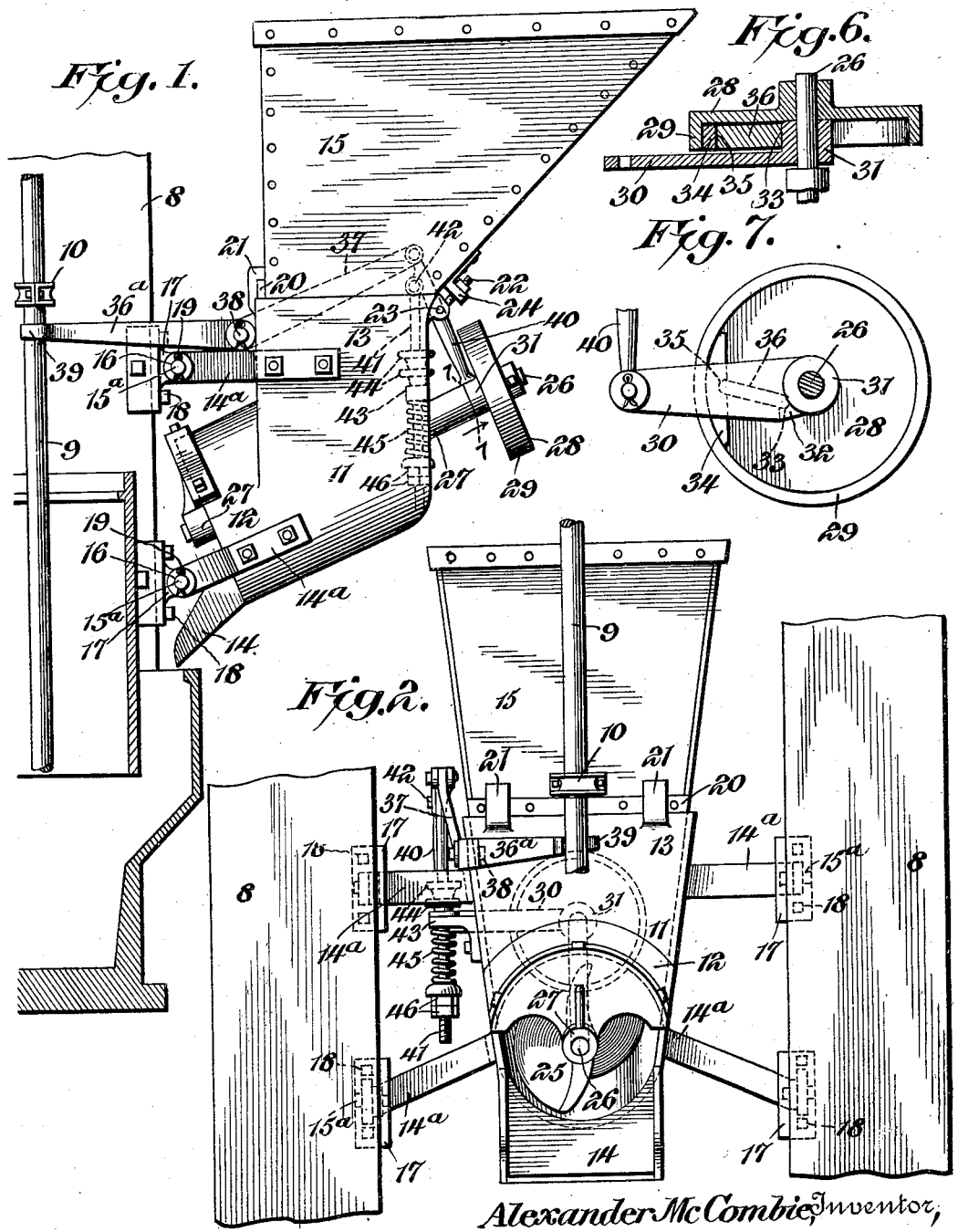

UNITED STATES PATENT OFFICE.

ALEXANDER McCOMBIE, OF GRASS VALLEY, CALIFORNIA.

ORE-FEEDER.

No. 903,491.      Specification of Letters Patent.      Patented Nov. 10, 1908.

Application filed April 18, 1907. Serial No. 368,968.

*To all whom it may concern:*

Be it known that I, ALEXANDER McCOMBIE, a citizen of the United States, residing at Grass Valley, in the county of Nevada and State of California, have invented a new and useful Ore-Feeder, of which the following is a specification.

This invention relates to improvements in feeders for stamp mills and the like, and the principal object is to provide a novel, simple and practicable structure in which an effective feed screw is employed that will properly feed the material either in a wet or dry state, and will also pass small pieces of quartz, which heretofore have occasioned great trouble by clogging the feed mechanism.

Another object is to provide a feeder that can be mounted directly on the frame of a stamp battery, is readily detachable therefrom, and moreover can be easily dismembered for the purpose of inspection or repair.

The preferred form of construction is illustrated in the accompanying drawings, wherein:—

Figure 1 is a side elevation of the feeder, showing the same in place on a stamp mill. Fig. 2 is a front elevation thereof. Fig. 3 is a rear elevation. Fig. 4 is a longitudinal sectional view. Fig. 5 is a side elevation of a portion of the screw operating mechanism. Fig. 6 is a horizontal sectional view through the clutch. Fig. 7 is a sectional view on the line 7—7 of Fig. 1.

Similar reference numerals designate corresponding parts in all the figures of the drawings.

In the embodiment illustrated, the stamp battery, which may be of any well known or desired construction, includes a frame having spaced uprights 8. One of the vertically reciprocatory stems of the battery is shown at 9, and has a tappet 10 secured thereon, said tappet being in the form of a sectional collar, as shown in Figs. 1 and 4. The casing of the feeder consists of a conduit or spout 11 having a lower downwardly inclined portion 12, and an upper substantially vertical inlet end 13. The inclined portion terminates in a suitable delivery lip 14. A hopper 15 is mounted on the inlet end 13. The said conduit or spout 11 has upper and lower sets of angularly disposed arms 14ª secured thereto, and said arms terminate at their inner or free ends in offset pins 15ª that detachably engage in openings 16 formed in ears 17 that are bolted or otherwise secured, as shown at 18 to the uprights 8 of the mill. This means therefore effectively secures the feeder to the frame of the machine, and yet permits its ready detachment. The pins, as shown, are retained in the ears by split keys 19 or other suitable means. The lower end of the hopper 15, as shown in Fig. 4, fits within the upper end of the conduit or spout, and said end has an outstanding rib 20 in its rear side that rests upon the upper edge of the rear wall of the conduit or spout. Hooks 21, carried by said upper end, engage over the rib, and thus a detachable interlocking engagement is secured between the two members. The outer sides of said members are connected by a swinging bolt 22 pivoted, as shown at 23 to the upper end of the spout or conduit, said bolt engaging in a notch formed in an outstanding lug or ear 24 that is fastened to the corresponding side of the hopper. This bolt thus serves not only to secure the corresponding outer walls of the two members together, but to maintain the interlocking engagement between said members. At the same time, it will be evident that by disengaging the bolt from the hopper, said hopper may be readily removed.

Located in the inclined portion 12 of the spout or conduit is a double feed screw 25, which includes a shaft 26 journaled in bearings 27 formed at the ends of said inclined portion. The shaft 26 projects beyond the outer wall of the spout or conduit, and has a wheel 28 fixed thereto, said wheel being provided with an annular offset rim 29. An arm 30 has a hub 31 loosely journaled on the shaft between the wheel 28 and the adjacent bearing 27, said hub having a portion located within the rim and provided with a lug 32 having a seat 33. A friction shoe 34 operates against the inner face of the rim, and has a seat 35. A link 36 is provided, and said link has its ends engaging in the seats 33 and 35. It will thus be evident that upon the movement of the arm 30 in one direction, the shoe 34 will slide freely against the inner face of the rim or upon the movement of the arm in the opposite direction, it will be clutched thereto. Thus an intermittent movement of the wheel and consequently of the screw can be secured. The oscillatory movement of the arm is secured by the following mechanism.

A lever composed of angularly disposed arms 36ª and 37 is fulcrumed between its ends as shown at 38 upon the spout or conduit. The arm 36ª is bifurcated at one end, as shown at 39, and embraces the stem 9 so that it will be engaged by the tappet 10. The other arm 37 of the lever is, in its normal position, parallel to the shaft 26 of the screw, and said arm has a pitman connection 40 with the outer end of the oscillatory arm 30. A reciprocatory stem 41, pivoted as shown at 42 to the pitman 40, has a sliding engagement in a guide lug or abutment 43 fixed to one side of the spout or conduit. Adjustable stop nuts 44 are threaded on the upper portion of the stem, and bear against the upper side of the abutment 43, while a coiled spring 45, mounted on said stem, has its upper end bearing against the under side of the abutment. The tension of the spring is varied by nuts 46 threaded on the lower end of the stem.

The operation of the structure is substantially as follows. The material to be fed to the battery is placed in the hopper 15, and as the stem 9 reciprocates, it will be evident that the tappet 10 will engage the bifurcated end 39 of the arm 36ª of the lever, thereby depressing said arm, and elevating the arm 37. This in turn will raise the arm 30, which as already shown, will be clutched to the wheel, thereby giving a partial rotation to the screw and feeding the material to the mill. As the stem 9 of the battery rises, the spring 45 which has been compressed, will react to move the lever downwardly, thus returning it to its original position. This movement is limited by the stop nuts 44, and consequently it will be seen that the extent of movement of the lever and of the screw can thus be varied, as desired.

There are a number of advantages for this structure. In the first place, the inclined relation of the parts with the double screw insures the proper feeding of the material either in a wet or dry state. Moreover experience has demonstrated that it will pass the small pieces of quartz, which sometimes get through the ore breaker and ordinarily choke up the feeders now in general use. Moreover the entire structure is mounted upon the frame of the mill, requiring no separate support. It will also be noted that all mechanism, both the supporting and operating means, is secured to the spout or conduit, and therefore if access to the screw is desired or if it becomes necessary to remove the hopper for any other reason, it is not necessary to dismember the actuating mechanism. Said actuating mechanism is exceedingly simple and yet is effective, particularly in view of the fact that because of the clutch employed, there is no lost motion, for as soon as the arm 30 starts upon its upward movement, the shoe will clutch the wheel and effect the movement of the screw.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In an ore feeder, the combination with a battery frame, of ears secured thereto, feeding mechanism including a conduit or spout, and angularly disposed sets of arms secured to the conduit or spout, the arms of each set being divergently disposed, said arms and ears being provided, one with sockets the other with pins, that detachably engage in the sockets.

2. In an ore feeder, the combination with a stamp battery frame, of ears secured thereto, feeding mechanism including a conduit or spout, arms carried by the conduit or spout and having offset pins that detachably engage in the ears, and means for retaining said pins in the ears.

3. In an ore feeder, the combination with an inclined feeding spout or conduit member having an upstanding inlet end, of means connected to the spout or conduit member for supporting the same, a downwardly tapered hopper member having its lower end fitted in the upstanding inlet end of the conduit or spout member, said hopper member being supported thereby, a rib carried by the hopper member and resting on the upper edge of the conduit or spout member, a hook rigidly carried by the latter member and engaging over the rib to prevent the separation of the adjacent portions of the members when the opposite portions are secured together, an ear carried by the opposite side of one member, and a swinging bolt carried by the corresponding side of the other member and detachably engaging the ear, said bolt and ear serving to detachably hold the members together.

4. In an ore feeder, the combination with a feed spout or conduit including an upright inlet portion, and an inclined lower delivery portion, of feeding means rotatably mounted in the inclined lower portion, means for supporting said feed spout or conduit, a lever fulcrumed between its ends on the spout or conduit and having its arms on opposite sides of its fulcrum disposed in angular relation, one of said arms being arranged substantially parallel to the axis of rotation of the feeding means and at one side of the upstanding inlet portion of the spout or conduit, and operating means for the lever coöperating with the other of said arms.

5. In an ore feeder, the combination with a rotatable screw, of means for rotating the same, said means including a clutch, an arm connected to the clutch, an actuating lever, a pitman connection between the lever and arm, a reciprocatory stem pivoted to the pitman, a spring mounted on the stem, a stationary abutment for the spring, and a movable abutment for the spring carried by the stem.

6. In an ore feeder, the combination with a rotatable feed screw, of means for rotating the same, including a swinging arm mounted thereon, a lever, a pitman connection between the lever and arm, a reciprocatory stem movable with the pitman connection, a guide through which said stem slidably passes, a stop nut threaded on the stem and engaging one side of the guide, a spring mounted on the stem and bearing against the opposite side of the guide, and a tension varying nut mounted on the stem and bearing against the spring.

7. In an ore feeder, the combination with a spout or conduit disposed at an inclination, of means for mounting the same in coöperating relation to a stamp battery, a rotatable screw journaled in the spout or conduit and having a shaft projecting from the rear end of the same, devices for operating the screw including a lever fulcrumed between its ends, one end of the lever being arranged to coöperate with a stem of the battery, an arm loosely journaled on the projecting end of the shaft, a pitman connection between the arm and lever, a wheel fixed to the projecting end of the shaft and having a rim, mechanism coöperating with the rim and operated by the arm that is journaled upon the shaft for rotating the wheel, a reciprocatory stem connected to one of the operating devices for the screw, a fixed and stationary guide through which the stem slidably passes, a spring mounted on the stem and bearing against one side of the fixed guide, and a stop nut adjustably mounted on the stem and movable to a position against the opposite side of the guide to limit the movement of the stem.

In testimony, that I claim the foregoing as my own, I have hereto affixed my signature in the presence of two witnesses.

ALEXANDER McCOMBIE.

Witnesses:
  J. M. THONSES,
  J. BARBETT.